United States Patent
Shah et al.

(10) Patent No.: US 9,558,374 B2
(45) Date of Patent: Jan. 31, 2017

(54) METHODS AND SYSTEMS FOR SECURING STORED INFORMATION

(71) Applicant: NETAPP, INC., Sunnyvale, CA (US)

(72) Inventors: Peter D. Shah, Waltham, MA (US); Won So, Watertown, MA (US)

(73) Assignee: NETAPP, INC., Sunnyvale, CA (US)

( * ) Notice: Subject to any disclaimer, the term of this patent is extended or adjusted under 35 U.S.C. 154(b) by 119 days.

(21) Appl. No.: 14/631,112

(22) Filed: Feb. 25, 2015

(65) Prior Publication Data
US 2016/0300080 A1 Oct. 13, 2016

Related U.S. Application Data

(60) Provisional application No. 62/103,211, filed on Jan. 14, 2015.

(51) Int. Cl.
*G06F 21/72* (2013.01)
*H04L 9/08* (2006.01)
*H04L 9/06* (2006.01)

(52) U.S. Cl.
CPC .......... *G06F 21/72* (2013.01); *H04L 9/0618* (2013.01); *H04L 9/0822* (2013.01); *H04L 9/0861* (2013.01); *H04L 9/0894* (2013.01)

(58) Field of Classification Search
CPC ...... H04L 9/0618; H04L 9/0861; G06F 21/72; G06F 21/60; G06F 21/62; G06F 21/6209; G06F 21/6218; G06F 21/6227; G06F 21/6236; G06F 21/6254; G06F 21/6263; G06F 21/6272; G06F 21/6281; G06F 21/629; G06F 2212/402
USPC ........................................................ 713/193
See application file for complete search history.

(56) References Cited

U.S. PATENT DOCUMENTS

| | | | |
|---|---|---|---|
| 8,266,430 B1 * | 9/2012 | Lumb | G06F 21/62 |
| | | | 713/165 |
| 8,397,083 B1 | 3/2013 | Sussland et al. | |
| 8,782,441 B1 * | 7/2014 | Osterwalder | G06F 21/602 |
| | | | 713/193 |

(Continued)

OTHER PUBLICATIONS

International Search Report and Written Opinion, dated Mar. 23, 2016, from PCT/US2015/067020, 12 pages.

(Continued)

*Primary Examiner* — William Goodchild
(74) *Attorney, Agent, or Firm* — Klein, O'Neill & Singh, LLP

(57) ABSTRACT

Methods and systems for securing information are provided. The method includes generating a hash key by an input/output (I/O) processing module interfacing with a processor executable application to encrypt a block of data of a data container to secure and store the data container; generating cipher text for the block of data encrypted with the hash key; using an encryption key to encrypt the hash key for the block of data; providing the cipher text and the encrypted hash key by the I/O processing module to a storage system for storage; where the I/O processing module segregates the encrypted hash key from the cipher text and maintains the encrypted hash key as part of metadata for the cipher text; and storing the cipher text with the encrypted hash key as the metadata for the cipher text for the block of data.

20 Claims, 13 Drawing Sheets

(56) References Cited

U.S. PATENT DOCUMENTS

2006/0126835 A1* 6/2006 Kim ................ H04L 9/0637
                                                    380/44
2012/0072713 A1  3/2012 Begum et al.
2014/0258719 A1* 9/2014 Cidon ................ G06F 21/62
                                                    713/165

OTHER PUBLICATIONS

Storer et al.; Secure Data Deduplication; Storage Systems Research Center; University of California, Santa Cruz; StorageSS'08; Oct. 31, 2008; Fairfax, Virginia, USA.

Bellare et al.; DupLESS: Server-Aided Encryption for Deduplicated Storage; $22^{nd}$ USENIX Security Symposium; pp. 179-194; Aug. 14-16, 2013; Washington, D.C., USA.

Douceur et al.; Reclaiming Space from Duplicate Files in a Serverless Distributed File System; Technical Report MSR-TR-2002-30; Microsoft Corporation; Jul. 2002; Redmond, Washington, USA.

* cited by examiner

METHODS AND SYSTEMS FOR SECURING STORED INFORMATION

CROSS-REFERENCE TO RELATED APPLICATIONS

This patent application claims priority under 35 USC 119 (e) over U.S. Provisional Patent Application, Ser. No. 62/103,211 filed on Jan. 14, 2105, entitled "Methods and Systems for Securing Stored Information", the disclosure of which is incorporated herein by reference in its entirety.

TECHNICAL FIELD

The present disclosure relates to storage systems and more particularly, to securing stored information.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server"), which is a processing system configured to store and retrieve data on behalf of one or more host computing systems ("hosts"). The storage system may be presented to a host system for storing information.

Information stored by storage systems today should preferably be secured. It is desirable to secure information closest to an application that is generating the information. It is also preferable to efficiently store the secured data by the storage system, using techniques like de-duplication. Continuous efforts are being made to efficiently secure and store data.

SUMMARY

In one aspect, a machine implemented method is provided. The method includes generating a hash key by an input/output (I/O) processing module interfacing with a processor executable application to encrypt a block of data of a data container to secure and store the data container; generating cipher text for the block of data encrypted with the hash key; using an encryption key to encrypt the hash key for the block of data; providing the cipher text and the encrypted hash key by the I/O processing module to a storage system for storage; where the I/O processing module segregates the encrypted hash key from the cipher text and maintains the encrypted hash key as part of metadata for the cipher text; and storing the cipher text with the encrypted hash key as the metadata for the cipher text for the block of data.

In another aspect, a non-transitory, machine readable storage medium having stored thereon instructions for performing a method is provided. The machine executable code which when executed by at least one machine, causes the machine to: generate a hash key by an input/output (I/O) processing module interfacing with a processor executable application to encrypt a block of data of a data container to secure and store the data container; generate cipher text for the block of data encrypted with the hash key; use an encryption key to encrypt the hash key for the block of data; provide the cipher text and the encrypted hash key by the I/O processing module to a storage system for storage; where the I/O processing module segregates the encrypted hash key from the cipher text and maintains the encrypted hash key as part of metadata for the cipher text; and store the cipher text with the encrypted hash key as the metadata for the cipher text for the block of data.

In yet another aspect, a system having a memory containing machine readable medium with machine executable code having stored thereon instructions is provided. A processor module coupled to the memory is configured to execute the machine executable code to: generate a hash key to encrypt a block of data of a data container to secure and store the data container; generate cipher text for the block of data encrypted with the hash key; use an encryption key to encrypt the hash key for the block of data; provide the cipher text and the encrypted hash key to a storage system for storage, where the encrypted hash key from the cipher text and maintains the encrypted hash key as part of metadata for the cipher text; and store the cipher text with the encrypted hash key as the metadata for the cipher text for the block of data.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The various features of the present disclosure will now be described with reference to the drawings of the various aspects of the present disclosure. In the drawings, the same components may have the same reference numerals. The illustrated aspects are intended to illustrate, but not to limit the present disclosure. The drawings include the following Figures:

FIG. 1I shows an illustration of process blocks of FIG. 1H;

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computing device. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, non-transitory storage media or any other storage device type, in accordance with the claimed subject matter.

In one aspect, as described below in detail, methods and systems for efficiently storing and securing information are provided. As an example, one of the methods include generating a hash key by an input/output (I/O) processing module interfacing with a processor executable application to encrypt each block of data for a write request; generating cipher text for each block of data encrypted with the hash key using an encryption key to encrypt the hash key for each block of data; providing the cipher text and the encrypted hash key by the I/O processing module to a storage system; and storing the cipher text with the encrypted hash key as metadata for the cipher text for each block of data by the storage system.

In another aspect, methods and systems are provided where cryptographic metadata is stored in a data container's data stream that improves overall performance for storing and managing data containers (for example, a file, structured or unstructured data and used interchangeably throughout the specification). The metadata is associated with portions of the data containers and segregated from the actual data of the data container. This allows a storage system to efficiently perform content-based operations, for example, de-duplication, as described below in detail.

Figure 1A:
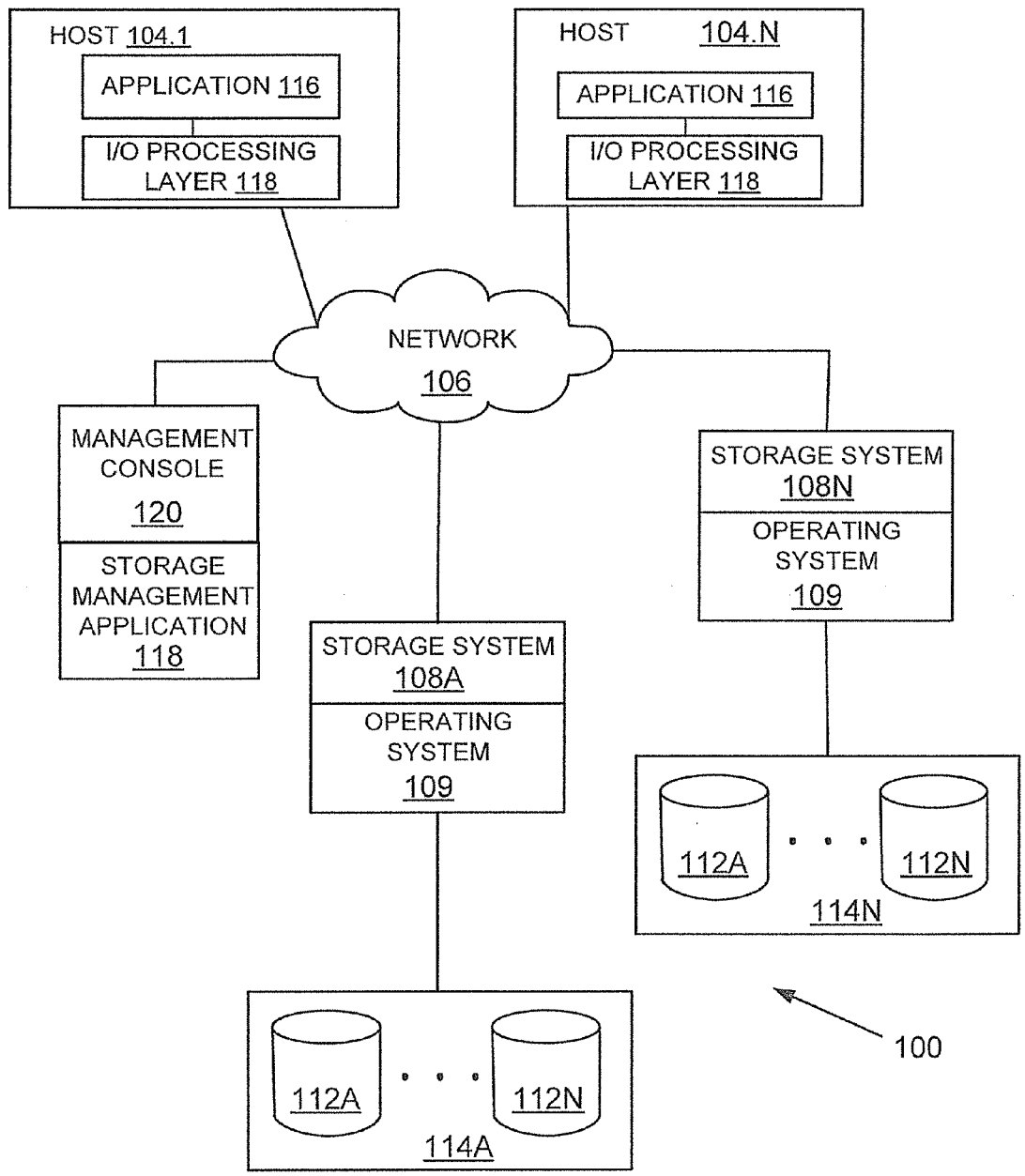
FIG. 1A shows an example of a non-cluster based storage environment, used according to one aspect of the present disclosure.

Non-Clustered Storage Environment 100:

FIG. 1A depicts an illustrative aspect of a non-clustered storage environment 100, including a plurality of host computing systems/devices 104.1-104.N (may also be referred to as host system (or client) and host systems (or clients) 104), storage systems 108A-108N (may also be referred to as storage system 108 or storage systems 108), a management console 120 and at least one interconnect system (or network) 106 communicably connecting host systems 104.1-104.N, storage systems 108 and management console 120.

In one aspect, each host system 104 executes a processor executable application 116 and an input/output (I/O) processing module 118. Application 116 may generate and secure information that is then stored by the storage system 108. Details regarding application 116 and I/O processing module 118 are provided below.

Each storage system 108 may include or interface with a storage subsystem 114 (shown as 114A-114N) having multiple mass storage devices 112A-112N (may also be referred to as storage device or storage devices 112). The mass storage devices 112 may be, for example, conventional magnetic disks, optical disks such as CD-ROM or DVD based storage, magneto-optical (MO) storage, or any other type of non-volatile storage devices suitable for storing structured or unstructured data.

The storage system 108 executes a storage operating system 109 for managing storage space within storage subsystem 114 and presenting storage space to host systems 104. As an example, storage operating system 109 may be the DATA ONTAP® storage operating system, available from NetApp®, Inc., that implements a Write Anywhere File Layout (WAFL®) storage system, or any other suitable storage operating system.

Storage operating system 109 and applications 116 running on the host systems 104.1-104.N communicate according to well-known protocols, such as the NFS protocol or the CIFS protocol, to make data stored on storage device 112 appear to users and/or application programs as though the data were stored locally on the host systems 104.1-104.N. CIFS means the Common Internet File System Protocol, an access protocol that host systems use to request file access services from storage systems over a network. NFS means a Network File System, a protocol that allows a user to access storage over a network.

Storage operating system 109 can present or export data stored at storage devices 112 as a volume (may also be referred to as a storage volume), or one or more qtree sub-volume units, to each of the host systems 104.1-104.N. In one aspect, a volume is a logical data set which is an abstraction of physical storage, combining one or more physical mass storage devices or parts thereof into a single logical storage object. From the perspective of a host system 104, each volume can appear to be a single storage drive. However, each volume can represent the storage space in one storage device, an aggregate of some or all of the storage space in multiple storage devices, a RAID group, or any other suitable set of storage space. Each volume may be configured to store data containers, for example, data files, scripts, word processing documents, executable programs, structured and unstructured data and the like. Specifically, each volume can include a number of individually addressable files.

The storage operating system 109 may implement a high-level module, such as a file system, to logically organize the information stored at storage devices 112 as a hierarchical structure of directories, files, blocks, structured and un-structured data (may be referred to as data containers). For example, each "on-disk" data container may be implemented as set of data structures, i.e., blocks, configured to store information, such as the actual data for storage volumes. These data blocks are organized within a logical volume block number (vbn) space that is maintained by the file system. The file system organizes the storage data blocks within the vbn space as a "logical volume"; each logical volume may be, although is not necessarily, associated with its own file system. The file system typically consists of a contiguous range of vbns from zero to n, for a file system of size n−1 blocks.

In one aspect, the storage operating system 109 manages stored data blocks by using content-based operations, for example, de-duplication. De-duplication is a technique used for eliminating storage of duplicate copies of data that is stored by the storage system 108. One common de-duplication implementation involves comparing data blocks and determining a hash function. When data is the same, the comparison results in a same hash function. In that situation, the storage system 108 only stores one copy of the data, which saves storage space.

In a typical mode of operation, one of the host systems 104.1-104.N transmits one or more I/O (input/output) commands, such as an NFS or CIFS request, over network 106 to the storage system 108 to read or write information. The storage system 108 issues one or more I/O commands to storage device 112 to read or write the data on behalf of the host system. The storage system 108 also issues an NFS or CIFS response containing the requested data over network 106 to the host system.

In some instances, operating system 109 may present storage system 108 to host systems as virtual storage systems (may also be referred to as a "vserver" and also referred to as virtual storage system). The virtual storage system is addressable by the host systems and handles input/output commands, just like storage system 108. This allows one to present a physical storage system as multiple virtual storage systems to various hosts.

The management console 120 may be, for example, a conventional PC, workstation, or the like. The storage management application 118 can be a software application, typically used by a storage network administrator to manage a pool of storage devices and other modules of system 100.

Communication between the storage management application 118 and storage system 108 may be accomplished using any of the various conventional communication protocols and/or application programming interfaces (APIs), the details of which are not germane to the technique being introduced here. This communication may be enabled by network 106 or via a direct link (not shown) between the management console 120 and one or more of the storage systems.

Conventional encryption systems that use standard encryption techniques for securing information have shortcomings. For example, traditional techniques may use random initialization vectors for encryption. This generates different cipher text blocks for identical plain text blocks. This makes it difficult for storage systems to efficiently perform content-based operations, for example, de-duplication because a storage system performing de-duplication will not be able to easily de-crypt stored encrypted data containers Convergent encryption (CE) including message-locked convergent encryption (MLE) techniques have been proposed to address the foregoing challenges of conventional encryption systems. CE is based on a premise that encryption of two identical pieces of data will produce identical cipher texts. MLE involves encrypting a hash key by an encryption key.

Existing conventional systems that may use CE and MLE techniques also have shortcomings. For example, most existing CE systems use convergent keys to secure arbitrarily sized files or objects. This makes it difficult for a storage system to efficiently perform content-based operations, for example, de-duplication. Furthermore, when existing CE systems use a hash key to encrypt block level data, they typically use a dedicated metadata server for managing the metadata and keys for the stored data. This of course results in higher cost and complexity for storing and accessing data.

Other conventional systems use complex key generation protocols with application servers and key servers. These solutions are also complex, and the encryption operation itself may use multiple network operations that affect overall performance. The various aspects described herein overcome conventional system short comings as described below in detail.

Figure 1B:
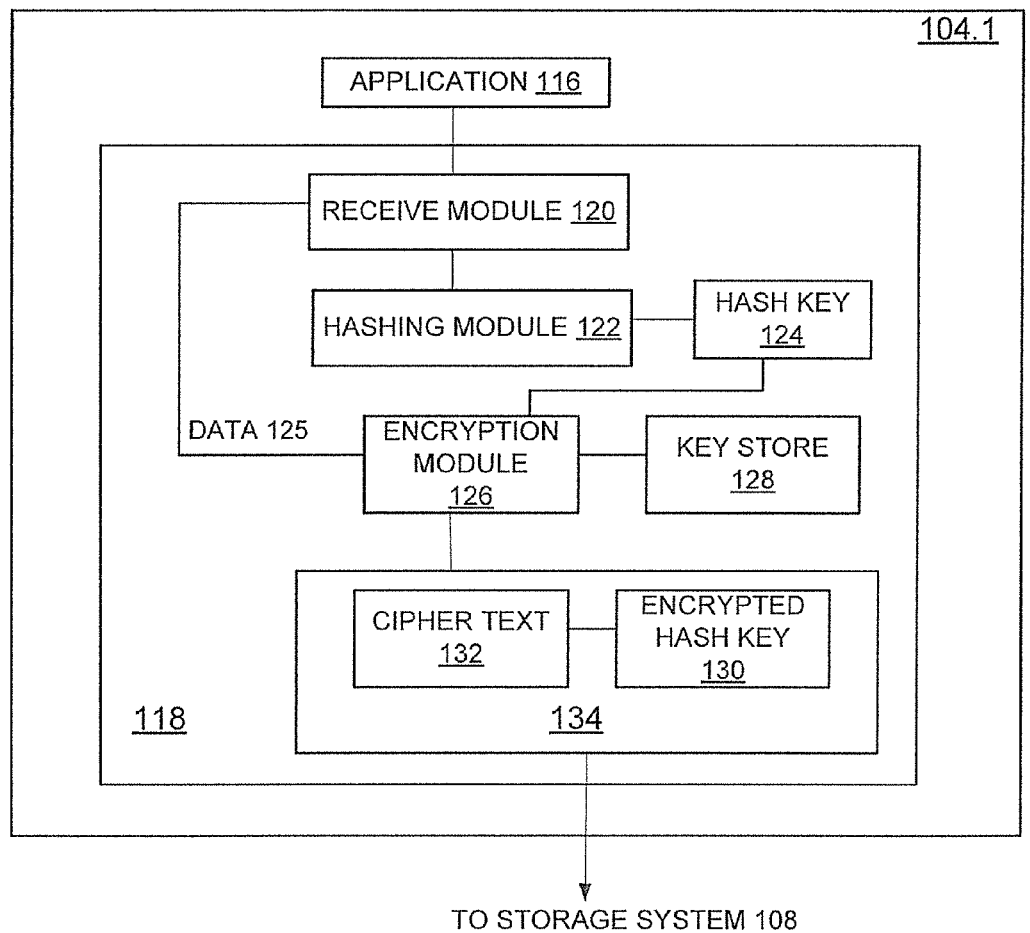
FIG. 1B shows an example of an input/output (I/O) processing layer, according to one aspect of the present disclosure.

Host System 104.1:

FIG. 1B shows a block diagram of host system 104. Host system 104 executes application 116 for performing one or more functions within an operating system context. The operating system may be based on Linux, Windows®, Unix or any other type. Application 116 may be an email application (Exchange Server), a database application (including Oracle® database application, SQL and others), word-processing and or any other application type. The adaptive aspects disclosed herein are not limited to any specific application.

To read or write data at storage system 108, application 116 generates an I/O request. When the I/O request is to write data, the request also includes the data that needs to be written. For retrieving data, the I/O request, provides a logical block address (LBA) and a LUN (or volume identifier).

The I/O request is provided to or intercepted by the I/O processing module 118 that may have a plurality of modules. As an example, a receive module 120 of the I/O processing module receives the write request with the data that needs to be written. In one aspect, the receive module 120 may include a driver (not shown) that is used to interface with the I/O processing module 118 used by the host system 104.1 to transmit I/O requests. The driver in that case interfaces between the application and other components of the I/O processing module 118.

The data 125 for the I/O request is provided to a hashing module 122 that generates a converged key (or a hash key) 124. The hash key 124 varies depending on the data. The hash key is provided to an encryption module 126 that also receives the data 125 that needs to be written. The encryption module 126 encrypts the data 125 using the hash key 124. The hash key 124 is also encrypted by using an encryption key obtained from a key store 128. It is noteworthy that the key store 128 may be external to the I/O processing module 118 or to host system 104.1. As an example, the encryption key may be a 256-bit key complying with the Advanced Encryption Standard (AES). Of course the adaptive aspects described herein are not limited to any specific encryption key type.

The encryption module 126 generates cipher text 132 and the encrypted hash key 130. Both the cipher text 132 and the encrypted hash key are provided to the storage system 108 for storage. The encrypted hash key 130 is stored as metadata for the cipher text 132. As an example, each block of data is stored as cipher text with the associated metadata as described below with respect to FIGS. 1C and 1D.

To retrieve stored data, I/O processing module 118 retrieves the metadata for a block, retrieves the encryption key that is used to encrypt the hash key and then uses the hash key to decrypt the data. Neither the application 116 nor storage system 108 need to make any changes in order to write or read client data.

To perform content-based operations, like de-duplication, the storage system 108 stores the cipher text once.

Figure 1C:
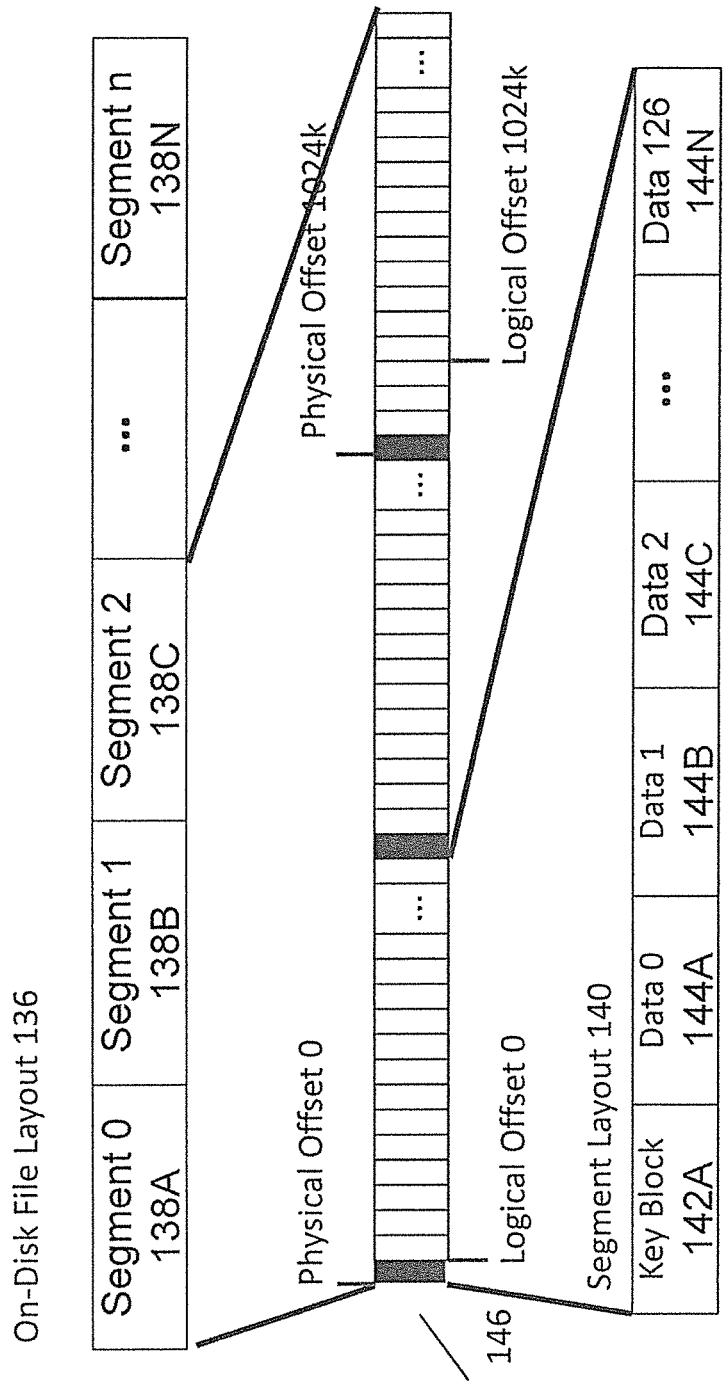
FIGS. 1C-1E show examples of data storage layout formats, according to one aspect of the present disclosure.

File Layout/Segment Layout:

FIG. 1C shows an example of a layout 136 used to secure data according to one aspect of the present disclosure. File layout 136 may include a plurality of segments 138A-138N, where, as an example, each segment may be of fixed size, for example, 512 k. Each segment is associated with a physical offset and a logical offset shown as 146 in FIG. 1C. The logical offset is associated with the logical block address and the physical offset is associated with the actual storage device. It is noteworthy that the segmentation and the internal file structure is handled by the I/O processing layer 118 and the storage system 108 is unaware of the segmentation.

Each segment has a consistent layout 140. As an example, each segment may include certain number of fixed size storage blocks, for example, 4 k. It is noteworthy that the storage block size may be variable to implement the various aspects of the present disclosure. As an example, the first block is used as a "key block" 142A, while blocks 144A-144N are used to store data blocks i.e. cipher text encrypted by a hash key. Details of segment layout 140 are shown as an example, in FIG. 1D.

Figure 1D:
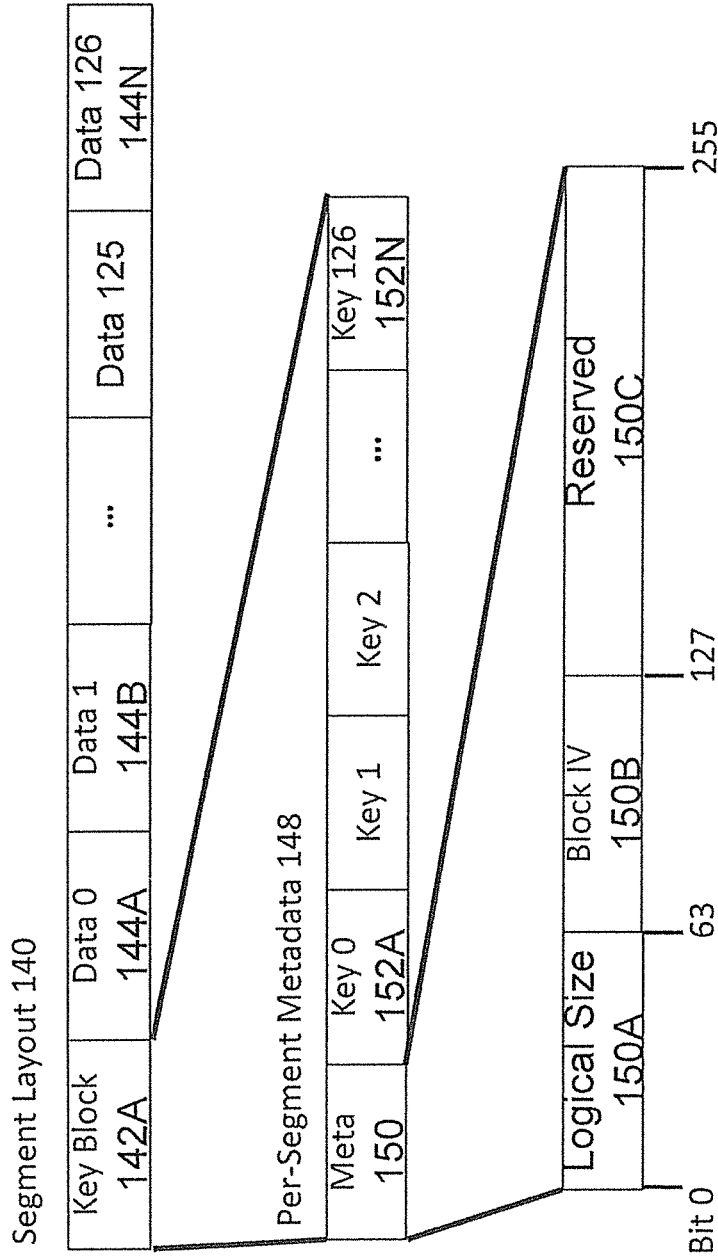

Key block 142A includes metadata for each segment. The first section of key block 142A includes generic metadata information (shown as "meta") 150, while the remaining portions 152A-152N store the encrypted hash key 130 for each data block. The metadata 150 includes a logical size of the file that is stored, shown as 150A, a block IV 150B and a reserved section 150C. Block IV 150B is an initialization vector, a randomized binary string used by the encryption module 126 for encrypting the metadata key block. Details of using the I/O processing module 118 and the segment layout 140 are provided below with respect to FIGS. 1F and 1G. It is noteworthy that although FIG. 1D shows metadata 150 and keys 152A-152N as part of per-segment metadata 148, the encryption keys and metadata 150 are considered as part of the overall metadata for the segment.

In one aspect, the order of blocks may be shuffled within a segment so that the internal structure of a file can be hidden. In such an implementation, even if a hacker can determine the number of blocks within a file, the hacker may not be able to determine which parts of an encrypted file correspond to those blocks.

In another aspect, the metadata described above may be maintained within a log structure. The log structure may include a table of hash keys with a plurality of fields. One of the field's is the hash key itself and the associated block number. Each time a data block is written, the hash key is written to the key block. If there is an older version of the hash key, it is not overwritten, instead the new key is written to an unused entry. This allows the system to store both versions of the key. The new version of the cipher text is written replacing the older version, without replacing the hash key. This provides crash tolerance in a situation where if the system crashes while a key block is being updated, both possible hash keys are saved in the key block and one of hash keys can be used to retrieve the associated data. The empty slots of the log structure are purged, for example, after the data blocks are persistently stored.

Figure 1E:
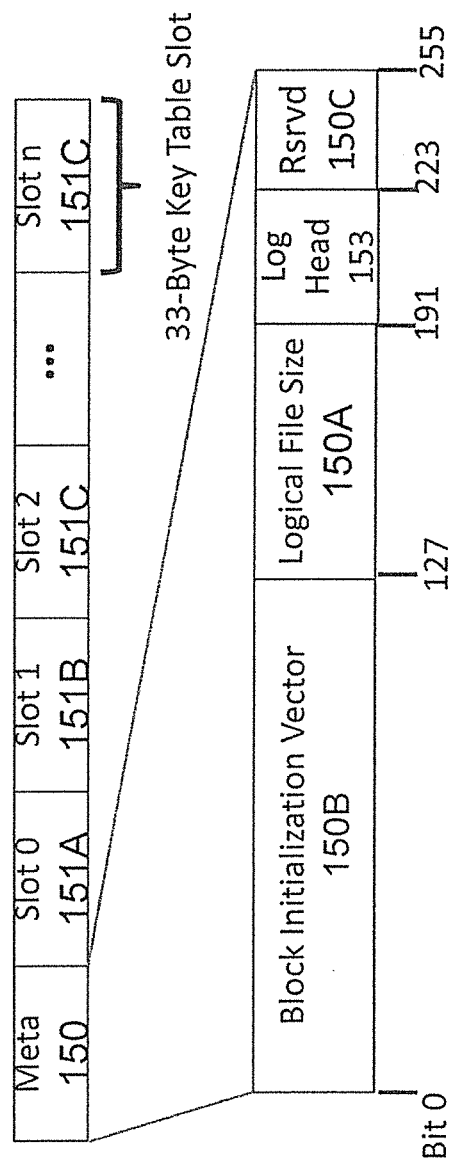

FIG. 1E shows an example of using the log structure, according to one aspect of the present disclosure. In this aspect, metadata segment has slots 0-n (151A-151N) that are used to store encrypted hash keys with the associated block number, however, the hash keys don't necessarily have to be in order. For example, slot 0 does not need to store the encrypted hash key for data block 0 and instead may store an encrypted hash key for another block.

Meta 150 includes the logical file size 150A and the block initialization vector 150, described above with respect to FIG. 1D. Meta 150 also includes a log head pointer 153 that points to a log-structure described above. The log head pointer 153 may be part of the reserved space 150C. As an example, the log structure maybe implemented as a circular log and the pointer 153 points to a last written slot (151A-151N) (also shown in FIG. 1I).

In one aspect, the log structure may be over-provisioned so that there are extra key slots in each segment's metadata block. This allows the system to store multiple encrypted hash keys for a subset of the blocks within a segment. Details and examples of using the log structure are provided below.

Figure 1F:
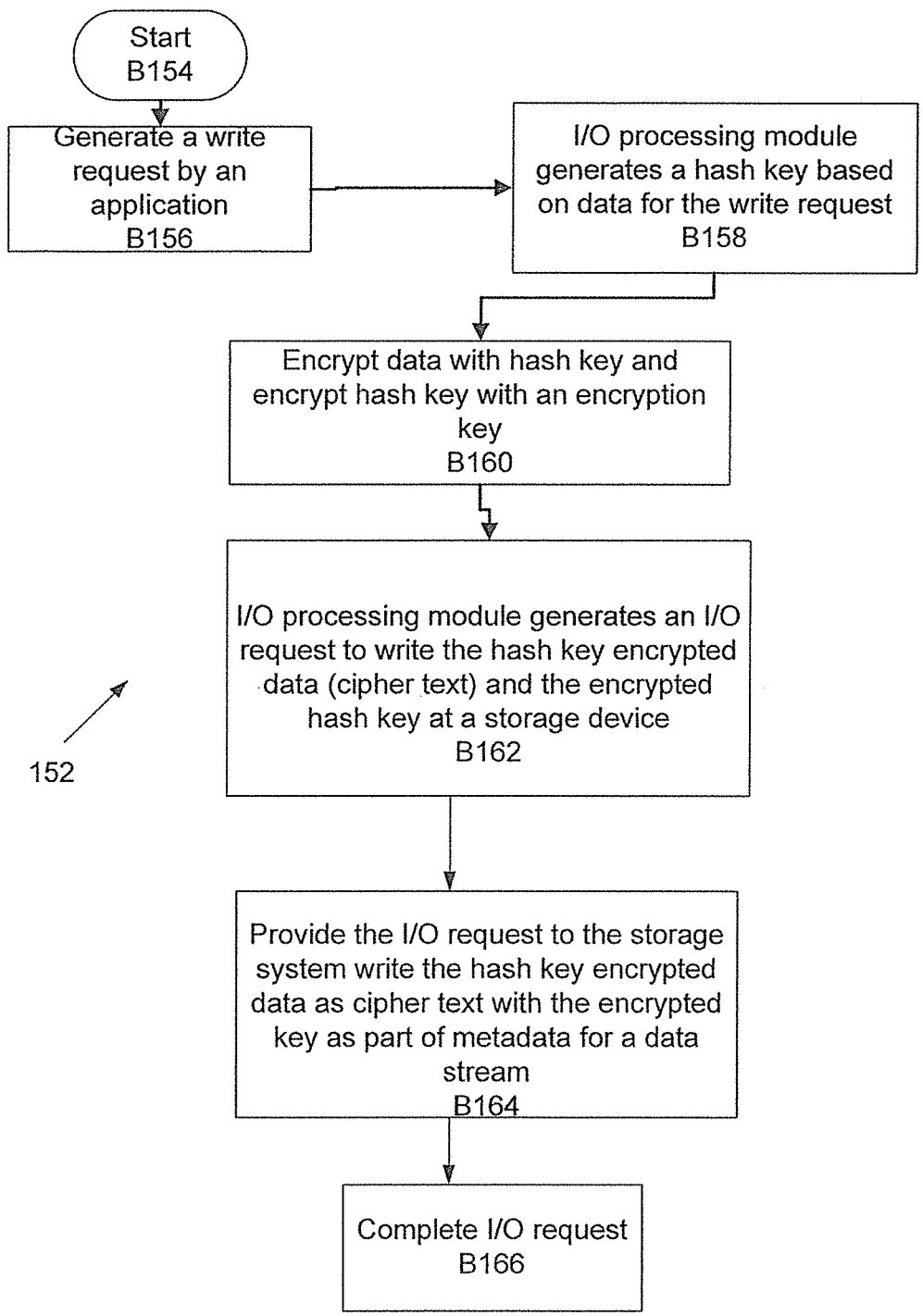
FIG. 1F shows a process flow diagram for a write operation, according to one aspect of the present disclosure.

Process Flow:

FIG. 1F shows a process 152 for writing data using I/O processing module 118, according to one aspect of the present disclosure. The process begins in block B154, when host system 104.1 with application 116 and I/O processing module 118 is initialized and operational. Storage system 108 and storage operating system 109 are also operational.

In block B156, application 116 generates a write request to write data using storage system 108. The data may be written as a file. The write request includes a file name, a byte offset into the file, size of the data payload and the data itself. The write request may include other information that are not germane to the innovative aspects and hence are not being described. The I/O processing module 118 receives or intercepts the write request. In block B158, the hashing module 122 takes the data payload and splits the data payload into fixed size blocks. As an example, the block size is the same as the block size used by the storage system 108 to store data. For each block of data, a hashing key 124 is generated. The hashing module 122 may use any standard hashing technique (for example, the secure hash algorithm (SHA-256, SHA-1 or any other technique)) or a proprietary technique to generate the hashing key 124.

In block B160, the encryption module 126 encrypts each data block by a hash key that is generated based on the data for each block. In one aspect, the encryption module 126 uses an encryption key to modify the hash key. The modified hash key is them used to encrypt the data block. The encrypted data block results in cipher text 132. Each hash key (or the modified hash key) is also encrypted by an encryption key (for example, a 256-bit, AES key). It is noteworthy that when the hash key is modified, then at least two encryption keys are used, one for generating the modified hash key to generate the cipher text and a second encryption key to protect the modified hash key. An example of block B160, using the log structure described above with respect to FIG. 1E is described below with respect to FIG. 1H.

Based on the cipher text 132 and the encrypted hash key, in block B162, the I/O processing module 118 generates a new I/O request to write the cipher text and encrypted hash key at storage devices 112. Thereafter, in block B164, the I/O processing module 118, provides the cipher text and the encrypted key to the storage system 108. The storage system 108 simply stores the cipher text and the encrypted hash key as shown on FIG. 1D above. The write request is then completed in block B166. A response is sent to the application 116 and the process ends.

Figure 1G:
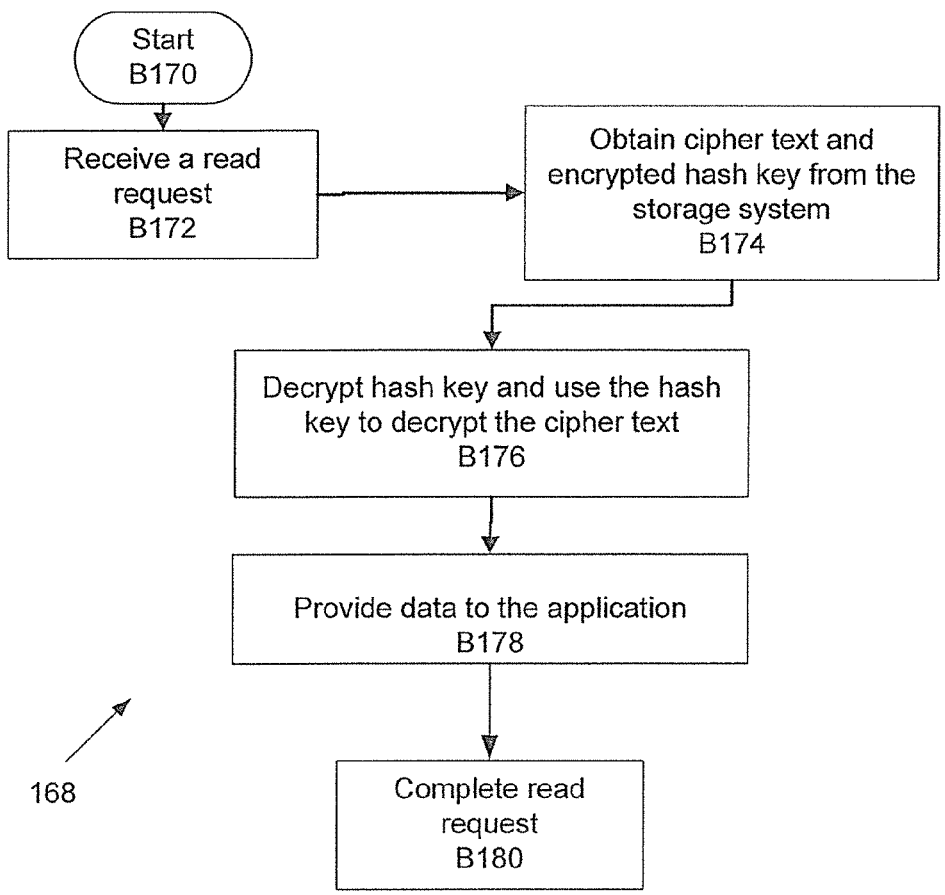
FIG. 1G shows a process flow diagram for a read operation, according to one aspect of the present disclosure.

FIG. 1G shows a process 168 to read stored data, according to one aspect. The process begins in block B170, when the host system 104.1 and the storage system 108 are operational. The process assumes that some data for one or more data containers is stored at the storage devices. To read the data, application 116 issues a read request, providing a file name and a file offset.

In block B172, read request is received or intercepted by the I/O processing module 118. In block B174, the I/O processing module 118 obtains the cipher text and the associated metadata with the encrypted hash key from the storage system 108. In block B176, the I/O processing module 118 obtains the encryption key for each encrypted hash key. As an example, the encryption key may be stored at the key store 128. The hash key is first decrypted and then the hash key is used to decrypt the cipher text. In one aspect, when the log structure described above with respect to FIG. 1E is used, then the process uses a block number to search for the encrypted hash key. If there is more than one key for the same block number, then the most recent key is used for executing process block B176. The unencrypted data is then provided to the application in block B178 and the process ends.

Figure 1H:
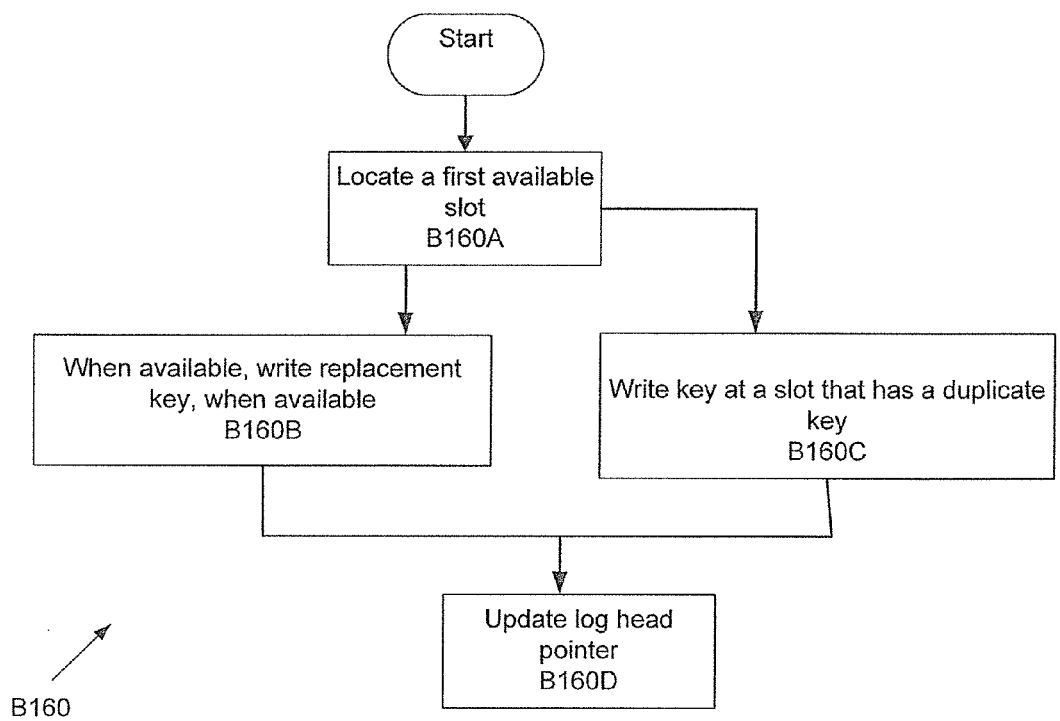
FIG. 1H shows an example of a portion if a write operation using a log structure.

FIG. 1H shows an example of executing process block B160 of FIG. 1F, according to one aspect of the present disclosure. An example of the FIG. 1H process is provided in FIG. 1I where a segment for a log having eight blocks is shown as 191. In this structure there are 8 slots that are already full and there is an extra slot labelled as "Empty".

Referring now to FIG. 1H, in block B160A, the process determines if there is new empty slot available within a segment to store a key for a previous block that has been written (for example, CEKey3 and the updated encrypted hash key is shown as CEKey3' shown in FIG. 1I). When an empty slot is available, then the updated encrypted hash key is written in block B160B. This is shown as 193 in FIG. 1E, where CEKey3' is written at the empty slot.

If an empty slot is not available, then the process searches the segment to see if a duplicate encrypted hash key exists for a block. When a duplicate location is found, then the encrypted hash key is written at the oldest slot in block B160C. This is shown as 195 in FIG. 1I, where the old CEKey3 is replaced by CEKEY5', an updated version for CEKey5. Thereafter, the log head pointer is updated in block B160D. This is shown as 197 in FIG. 1I, where the pointer points to the latest slot that was written.

As described above, data is stored securely and efficiently in a crash-tolerant manner. Content-based operations by the storage system 108 are not affected because the storage system 108 stores the cipher text and the metadata together, just like regular, unsecured data.

Figure 2:
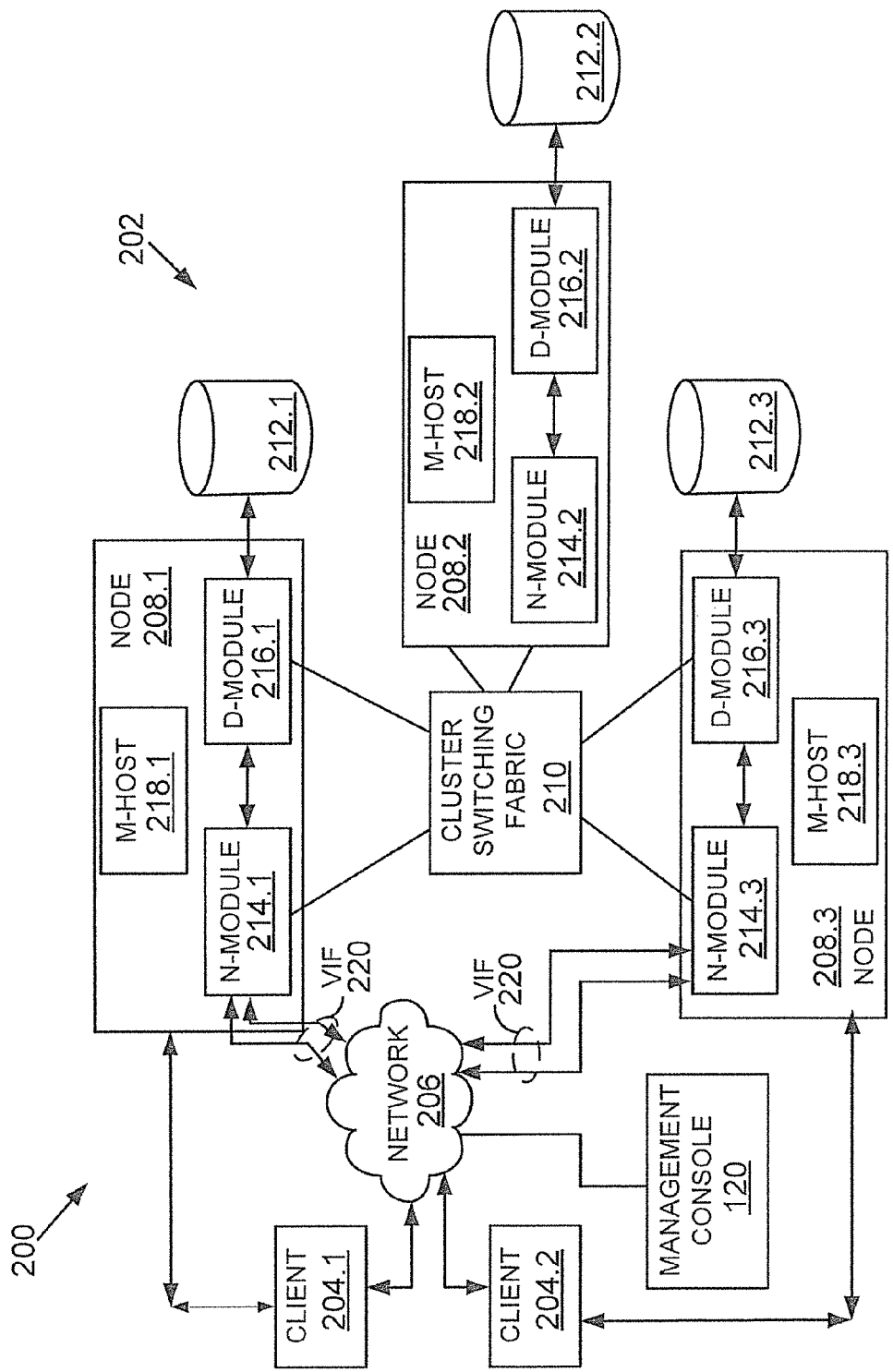
FIG. 2 shows a block diagram of a cluster based storage system, used according to one aspect of the present disclosure.

Clustered Storage Environment 200:

The adaptive aspects described herein can be implemented in a cluster based system that has a distributed architecture. FIG. 2 depicts an illustrative aspect of a clustered storage environment 200 including a plurality of host systems 204.1-204.2 (similar to hosts 104.1-104.N), a clustered storage system 202 and at least one computer network 206 communicably connecting the host systems 204.1-204.2 and the clustered storage system 202. The clustered storage system 202 includes a plurality of nodes 208.1-208.3, a cluster switching fabric 210, and a plurality of mass storage devices 212.1-212.3 for storing cipher text and the associated metadata, as described above.

Each of the plurality of nodes 208.1-208.3 may be configured to operate as a storage system. Each node may include an N-module, a D-module, and an M-host, each of which can be implemented as a separate processor executable or machine implemented module. Specifically, node 208.1 includes an N-module 214.1, a D-module 216.1, and an M-host 218.1, node 208.2 includes an N-module 214.2, a D-module 216.2, and an M-host 218.2, and node 208.3 includes an N-module 214.3, a D-module 216.3, and an M-host 218.3.

The N-modules 214.1-214.3 include functionality that enables the respective nodes 208.1-208.3 to connect to one or more of the host systems 204.1-204.2 over the computer network 206, while the D-modules 216.1-216.3 connect to one or more of the storage devices 212.1-212.3.

The M-hosts 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective N-modules 214.1-214.3 and the host systems 204.1-204.2, allowing storage 212.1-212.3 associated with the nodes 208.1-208.3 to be presented to the host systems 204.1-204.2 as a single shared storage pool. For example, the switched virtualization layer may implement a virtual interface architecture. FIG. 2 depicts only the VIFs 220 at the interfaces to the N-modules 214.1, 214.3 for clarity of illustration.

The clustered storage system 202 can be organized into any suitable number of vservers, in which each virtual storage system represents a single storage system namespace with separate network access. Each vserver has a user domain and a security domain that are separate from the user and security domains of other virtual storage systems. Host systems can access storage space via a VServer from any node of the clustered system 202.

Each of the nodes 208.1-208.3 may be defined as a computer adapted to provide application services to one or more of the host systems 204.1-204.2. The nodes 208.1-208.3 are interconnected by the switching fabric 210, which, for example, may be embodied as a Gigabit Ethernet switch or any other interconnect type.

Although FIG. 2 depicts three N-modules 214.1-214.3, the D-modules 216.1-216.3, and the M-Hosts 218.1-218.3, any other suitable number of N-modules, D-modules, and M-Hosts may be provided. There may also be different numbers of N-modules, D-modules, and/or M-Hosts within the clustered storage system 202. For example, in alternative aspects, the clustered storage system 202 may include a plurality of N-modules and a plurality of D-modules interconnected in a configuration that does not reflect a one-to-one correspondence between the N-modules and D-modules.

The host systems 204.1-204.2 of FIG. 2 may be implemented as general-purpose computers configured to interact with the respective nodes 208.1-208.3 in accordance with a client/server model of information delivery. In the presently disclosed aspect, the interaction between the host systems 204.1-204.2 and the nodes 208.1-208.3 enable the provision of network data storage services.

Specifically, each host system 204.1, 204.2 may request the services of one of the respective nodes 208.1, 208.2, 208.3, and that node may return the results of the services requested by the host system by exchanging packets over the computer network 206, which may be wire-based, optical fiber, wireless, or any other suitable combination thereof. The host systems 204.1-204.2 may issue packets according to file-based access protocols, such as the NFS or CIFS protocol, when accessing information in the form of files and directories.

Figure 3:
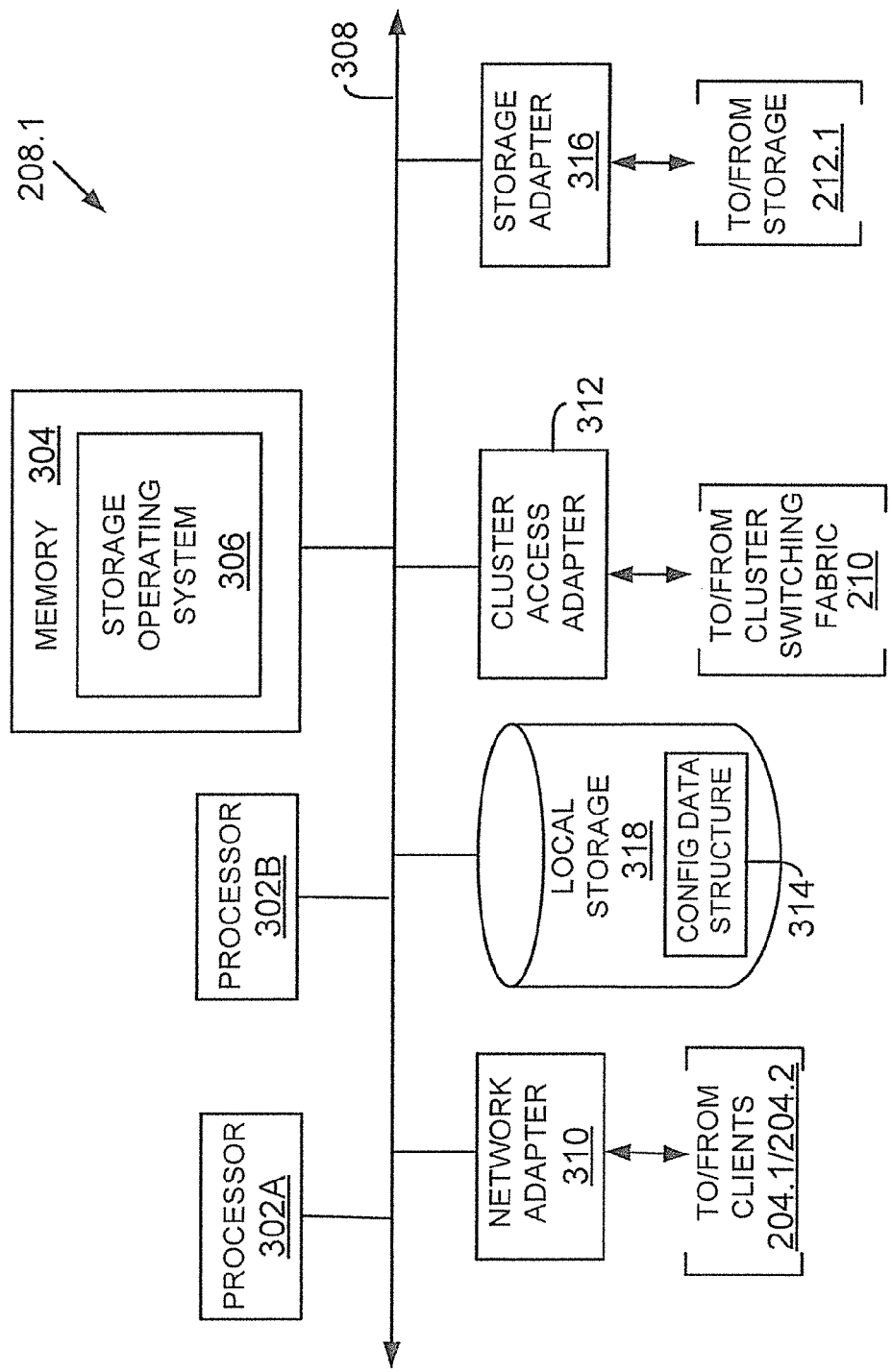
FIG. 3 shows an example of a node used in a cluster based storage system, used according to one aspect of the present disclosure of the present disclosure.

Storage System Node 208.1:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 318 interconnected by a system bus 308. The local storage 318 comprises one or more storage devices utilized by the node to locally store configuration information (e.g., in a configuration data structure 314).

The cluster access adapter 312 comprises a plurality of ports adapted to couple node 208.1 to other nodes of cluster 100. In the illustrative aspect, Ethernet (or any other protocol) may be used as the clustering protocol and interconnect media, although it will be apparent to those skilled in the art that other types of protocols and interconnects may be utilized within the cluster architecture described herein. In alternate aspects where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the present disclosure.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more hosts 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network, a Fibre Channel network or any other network type. Each host 204.1/204.2 may communicate with the node over network 206 by exchanging discrete frames or packets of data according to predefined protocols, such as TCP/IP.

The storage adapter 316 cooperates with the storage operating system 306 executing at node 208.1 to write and access information requested by the hosts as described above. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
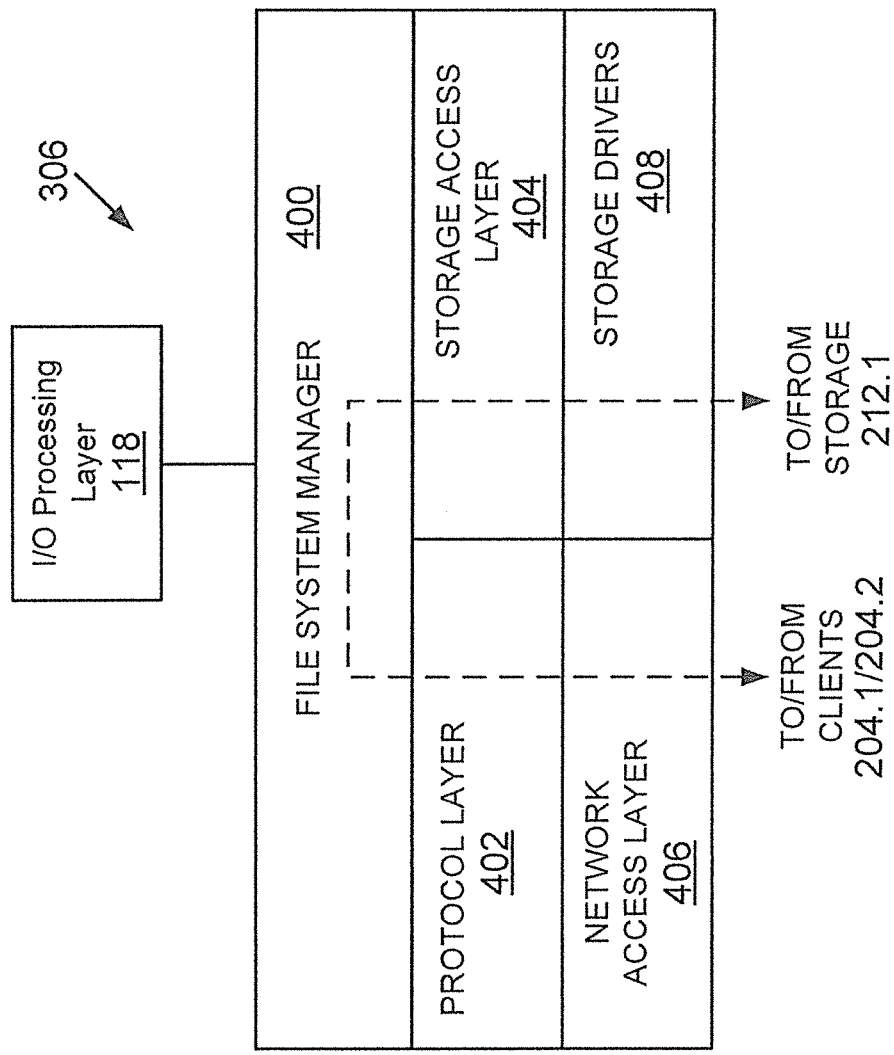
FIG. 4 shows a block diagram of an operating system, used according to one aspect of the present disclosure.

Operating System:

FIG. 4 illustrates a generic example of storage operating system 306 executed by node 208.1, according to one aspect of the present disclosure. The storage operating system 306 manages all the storage volumes and conducts read and write operations and interfaces with the I/O processing module 118 described above in detail.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operations, i.e. executes read/write operations on storage in response to host system 204.1/204.2 requests, as described above.

Operating system 306 may also include a protocol layer 402 and an associated network access layer 406, to allow node 208.1 to communicate over a network with other systems, such as host systems 204.1/204.2. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between host systems' 204.1/204.2 and mass storage devices 212.1 are illustrated schematically as a path, which illustrates the flow of data through operating system 306.

The operating system 306 may also include a storage access layer 404 and an associated storage driver layer 408 to allow D-module 216 to communicate with a storage device. The storage access layer 404 may implement a higher-level storage protocol, such as RAID, while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX@ or Windows XP®, or as a general-purpose operating system with configurable functionality, which is configured for storage applications as described herein.

In addition, it will be understood to those skilled in the art that the various inventive aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
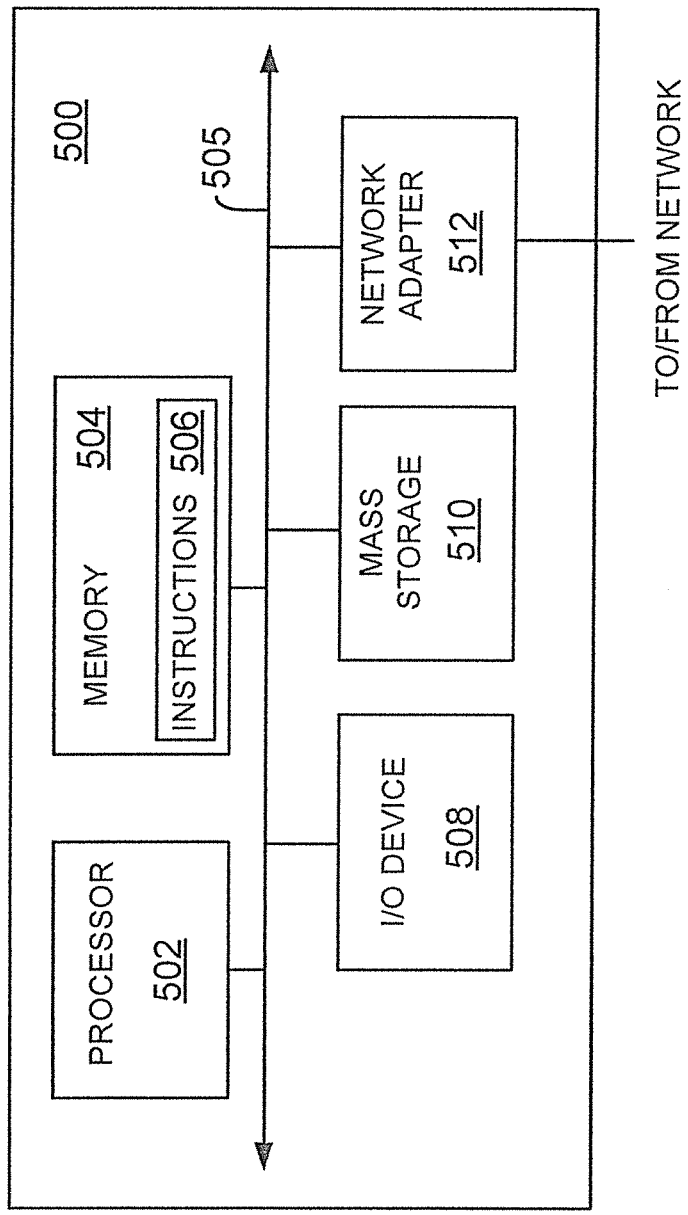
FIG. 5 shows an example of a processing system used according to one aspect of the present disclosure.

Processing System:

FIG. 5 is a high-level block diagram showing an example of the architecture of a processing system that may be used according to one aspect. The processing system 500 can represent host 104, 204 or storage system 108, for example. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USE), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implement the process steps described above with respect to FIGS. 1E and 1F may reside in and execute (by processors 502) from memory 504.

Also connected to the processors 502 through the bus system 505 are one or more internal mass storage devices 510, and a network adapter 512. Internal mass storage devices 510 may be or include any conventional medium for storing large volumes of data in a non-volatile manner, such as one or more magnetic or optical based disks. The network adapter 512 provides the processing system 500 with the ability to communicate with remote devices (e.g., storage servers 20) over a network and may be, for example, an Ethernet adapter, a Fibre Channel adapter, or the like.

The processing system 500 also includes one or more input/output (I/O) devices 508 coupled to the bus system 63. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at host system computers. After the application layer, is a cloud platform and cloud infrastructure, followed by a "server" layer that includes hardware and computer software designed for cloud specific services. In this example, a source storage system and a destination storage system may be presented in a cloud for storing information.

Thus, a method and apparatus for securing stored data have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
generating a hash key by an input/output (I/O) processing module interfacing with a processor executable application based on content of a block of data of a data container having a plurality of blocks;
modifying the hash key using a first encryption key;
generating cipher text for the block of data using the modified hash key;
using a second encryption key to encrypt the modified hash key for the block of data;
providing the cipher text and the encrypted modified hash key by the I/O processing module to a storage system for storage; wherein the I/O processing module segregates the encrypted modified hash key from the cipher text and maintains the encrypted modified hash key as part of metadata for the cipher text; and
storing the cipher text with the encrypted modified hash key as the metadata for the cipher text for the block of data; wherein a data structure stores more than one version of the modified hash key for the block data that is updated over time such that any version of the modified hash key is used for decrypting the block of data; and wherein an order of cipher text and associated metadata for each of the plurality of blocks is shuffled within a segment used to store the cipher text and the associated metadata.

2. The method of claim 1, wherein the metadata is stored as part of a data stream of the data container.

3. The method of claim 1, further comprising:
obtaining metadata for stored cipher text in response to a read request;
decrypting the modified hash key for each data block; and
using a most recent version of the decrypted hash key to decrypt cipher text for providing data in response to the read request, when more than one version of the modified hash key is stored for one or more of the plurality of data blocks.

4. The method of claim 1, wherein the metadata is for a portion of the data container and segregated from data of the data container.

5. The method of claim 1, wherein the segment is implemented as a circular log data structure having extra memory slots for storing more than one version of the modified encrypted hash key.

6. The method of claim 5, wherein to create space for a new hash key, an oldest version of an existing hash key is deleted from a slot of the circular log data structure.

7. The method of claim 1, wherein each of the plurality of blocks is of a fixed size.

8. A non-transitory, machine readable storage medium having stored thereon instructions for performing a method, comprising machine executable code which when executed by at least one machine, causes the machine to:
generate a hash key by an input/output (I/O) processing module interfacing with a processor executable application based on content of a block of data of a data container having a plurality of blocks;
modify the hash key using a first encryption key;
generate cipher text for the block of data using the modified hash key;
use a second encryption key to encrypt the modified hash key for the block of data;
provide the cipher text and the encrypted modified hash key by the I/O processing module to a storage system for storage; wherein the I/O processing module segregates the encrypted modified hash key from the cipher text and maintains the encrypted modified hash key as part of metadata for the cipher text; and
store the cipher text with the encrypted modified hash key as the metadata for the cipher text for the block of data; wherein a data structure stores more than one version of the modified hash key for the block data that is updated over time such that any version of the modified hash key is used for decrypting the block of data; and wherein an order of cipher text and associated metadata for each of the plurality of blocks is shuffled within a segment used to store the cipher text and the associated metadata.

9. The non-transitory, storage medium of claim 8, wherein the metadata is stored as part of a data stream of the data container.

10. The non-transitory, storage medium of claim 8, wherein the executable code further causes the machine to:
obtain metadata for stored cipher text in response to a read request;
decrypt the modified hash key for each data block; and
use a most recent version of the decrypted hash key to decrypt cipher text for providing data in response to the read request, when more than one version of the modified hash key is stored for one or more of the plurality of data blocks.

11. The non-transitory, storage medium of claim 10, wherein the metadata is for a portion of the data container and segregated from data of the data container.

12. The non-transitory, storage medium of claim 8, wherein the segment is implemented as a circular log data structure having extra memory slots for storing more than one version of the modified encrypted hash key.

13. The non-transitory storage medium of claim 12, wherein to create space for a new hash key, an oldest version of an existing hash key is deleted from a slot of the circular log data structure.

14. The non-transitory storage medium of claim 8, wherein each of the plurality of blocks is of a fixed size.

15. A system comprising:
a memory containing machine readable medium comprising machine executable code having stored thereon instructions; and a processor module coupled to the memory, the processor module configured to execute the machine executable code to:
generate a hash key based on content of a block of data of a data container having a plurality of blocks;
modify the hash key using a first encryption key;
generate cipher text for the block of data using the modified hash key;
use a second encryption key to encrypt the modified hash key for the block of data;
provide the cipher text and the encrypted modified hash key to a storage system for storage, where the encrypted modified hash key is segregated from the cipher text and the encrypted modified hash key is maintained as part of metadata for the cipher text; and
store the cipher text with the encrypted modified hash key as the metadata for the cipher text for the block of data; wherein a data structure stores more than one version of the modified hash key for the block data that is updated over time such that any version of the modified hash key is used for decrypting the block of data; and wherein an order of cipher text and associated metadata for each of the plurality of blocks is shuffled within a segment used to store the cipher text and the associated metadata.

16. The system of claim 15, wherein the metadata is stored as part of a data stream of the data container.

17. The non-transitory, storage medium of claim 15, wherein the processor module further executes the machine executable code to:
obtain metadata for stored cipher text in response to a read request;
decrypt the modified hash key for each data block; and
use a most recent version of the decrypted hash key to decrypt cipher text for providing data in response to the read request, when more than one version of the modified hash key is stored for one or more of the plurality of data blocks.

18. The system of claim 15, wherein the segment is implemented as a circular log data structure having extra memory slots for storing more than one version of the modified encrypted hash key.

19. The system of claim 15, wherein the metadata is for a portion of the data container and segregated from data of the data container.

20. The system of claim 15, wherein each of the plurality of blocks is of a fixed size.

* * * * *